United States Patent
Morrow

[15] 3,700,966
[45] Oct. 24, 1972

[54] MONITORING CIRCUIT FOR DETECTING LEAKAGE CURRENTS

[72] Inventor: Paul Morrow, Basin Road, New Castle, Del. 19720

[22] Filed: May 19, 1971

[21] Appl. No.: 144,914

[52] U.S. Cl. ................................. 317/18 D, 340/255
[51] Int. Cl. ............................................. H02h 3/28
[58] Field of Search ............ 317/18 R, 18 D; 340/255

[56] References Cited

UNITED STATES PATENTS

| 3,436,599 | 4/1969 | Rogers | 317/18 D |
| 3,515,942 | 6/1970 | Gordon | 317/18 D |
| 3,287,636 | 11/1966 | Gagniere | 317/18 D |
| 3,286,129 | 11/1966 | Gagniere | 317/18 D |

Primary Examiner—James D. Trammell
Attorney—Shormaker & Mattare

[57] ABSTRACT

The leakage currents to ground from the power input conductors connected to a load are detected. When these leakage currents reach a selected magnitude, an amplifier responds to produce a usable output for indicating dangerous leakage current conditions. Detection takes place by means of a diode connected to each input conductor, the latter carrying an ac voltage, which diodes are connected in common to ground through a load resistor to provide paths for purely resistive leakage currents in phase with the ac voltage. An amplifier is connected to this load resistor to detect the in phase leakage currents. To detect out of phase or wattless leakage currents due to capacitive coupling between the input conductors and ground, a further diode, load resistor and amplifier combination is used and its output is summed with the in phase output to drive a further amplifier whose output is adjusted to operate only when the sum of the in phase and out of phase inputs reaches a selected value.

14 Claims, 3 Drawing Figures

INVENTOR
PAUL MORROW
BY Shoemaker and Mattare
ATTORNEYS.

MONITORING CIRCUIT FOR DETECTING LEAKAGE CURRENTS

BACKGROUND OF THE INVENTION

There are many instances in which leakage current which inevitably occurs between the input conductors to a load and ground may, if great enough, give difficulty in operation of the load device or, in some instances, may lead to potentially dangerous situations. For example, electrocardiographic equipment, electroencepholographic equipment, pacemakers, insertion probes are examples of currently used medical instruments which are normally very effective tools but which can become hazardous because of leakage of micro currents from the instrument through the patient to ground due to normal aging of the electrical insulation particularly of the power input conductors to the instrument. Such leakage may also affect the instrument's accuracy.

Since the instrument user cannot recognize micro currents which are of such amplitudes as indicate a potentially hazardous situation, there is a great need for a simple, effective and reliable detection or monitoring circuit for monitoring these leakage currents and, when they become great enough, either to provide a warning indication or to terminate operation of the instrument.

BRIEF SUMMARY OF THE INVENTION

The present invention relates to a monitoring circuit for instruments as, for example, of the type above described and which monitoring circuit consists of a balanced fault type ground detector and auxiliary circuitry and devices for reading out the system condition and having an output proportional to leakage currents which may be utilized either to provide a warning indication or to shut the instrument down.

The monitoring circuit includes a detector having main branches for each of the input conductors and including diodes connected to the input conductors so that when the power input is ac, ground leakage currents during each positive half cycle at a particular input conductor are passed through the corresponding main branch and all of the main branches are connected to a load resistor driving an amplifier. These main branches detect the in phase leakage currents. For out of phase leakage currents, an auxiliary branch is provided including a further diode and load resistor and amplifier connected to the load resistor. The outputs of these two amplifiers are summed and applied to a further amplifier having a set point input so that when the detected leakage currents exceed a predetermined or selected value, the last amplifier produces an output for effecting the desired signal or shut down operation.

For dc systems, an alternating current voltage is impressed upon the input conductors to the load for driving the detector system.

BRIEF DESCRIPTION OF THE DRAWING FIGURES

DETAILED DESCRIPTION OF THE INVENTION

Figure 1:
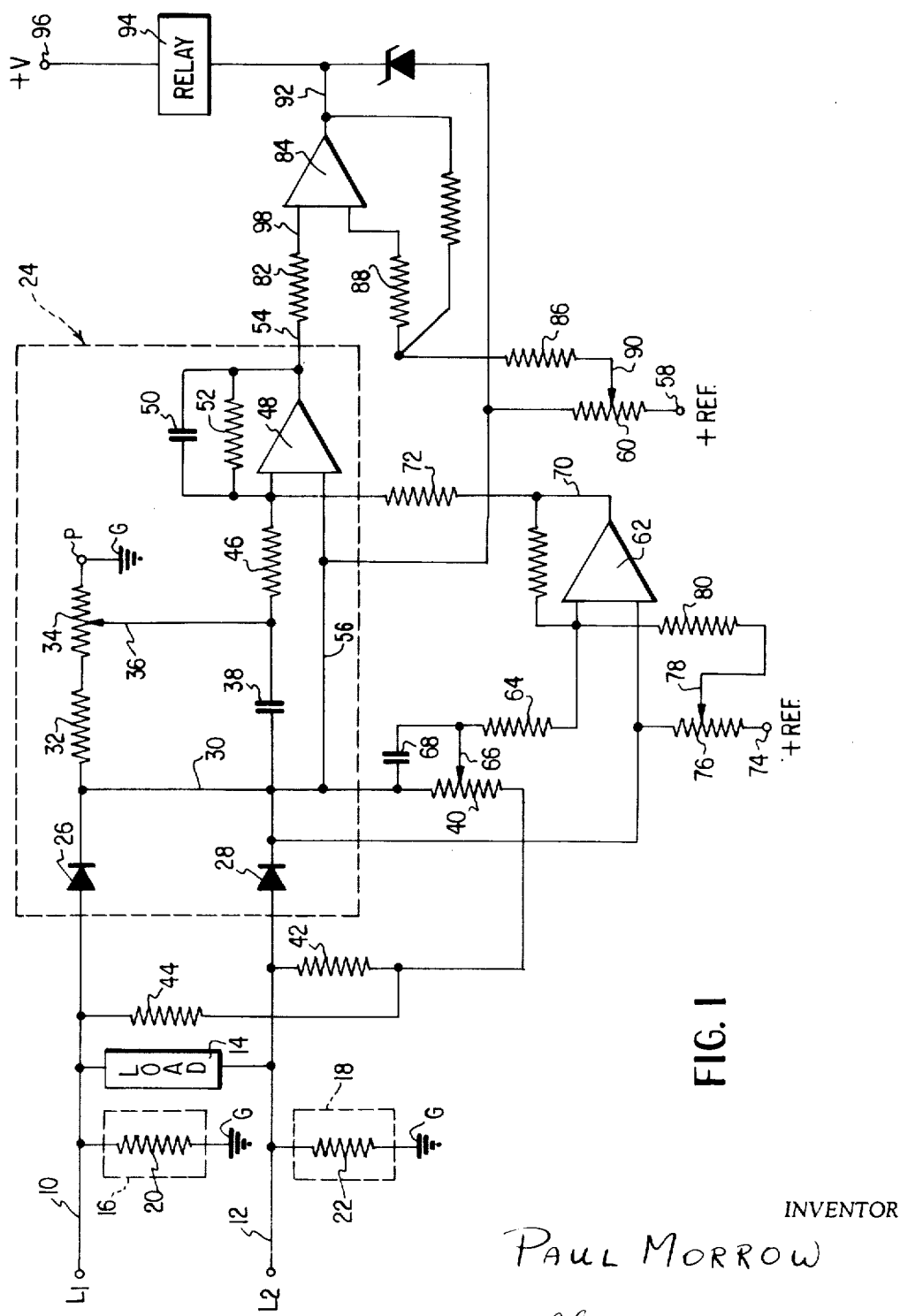
FIG. 1 is a circuit diagram illustrating one embodiment of the present invention.

With reference at this time more particularly to FIG. 1, a pair of input conductors are indicated by the reference characters 10 and 12 and which provide the supply voltage for a load 14 as shown. For purposes of description in connection with FIG. 1, it will be assumed that the supply provided by the conductors 10 and 12 is 115V, 60Hz single phase power input.

Each conductor is illustrated, within the dashed line boxes 16 and 18, as having resistive coupling to ground, as indicated by the respective resistors 20 and 22 each of which is connected to ground G, as indicated. The detector indicated in FIG. 1 is within the dashed line box indicated generally by the reference character 24 and will be seen to include a pair of diodes 26 and 28 connected to their respective conductors 10 and 12 and connected in common, through the conductor 30, the resistor 32 and the load resistor 34, to the point P which is connected to ground G as indicated. Two main branches for leakage current are thus established in the detector means 24. To illustrate these main branches, it is assumed first that the conductor 10 is operating during a positive half cycle of the input power such that leakage current tends to flow through the resistor 20 to ground G and some of which leakage current will flow through the resistor 22 to the other conductor 12. At the same time, since the conductor 10 is on a positive half cycle, some leakage current will flow through the diode 26, the resistor 32 and 34 to the point P and to ground G and thenthrough the ground G of the resistor 22 to the other conductor 12. During a positive half cycle on the conductor 12, the other main branch is established through the diode 28, the conductor 30 and the resistors 32 and 34 to the point P and to ground and then through the resistor 20 to the other conductor 10.

In both cases, positive voltage pulses in phase with the power supply will be impressed across the load resistor 34 so as to provide, correspondingly, positive voltage pulses at the movable tap 36 which are coupled to the capacitor 38, the capacitor 38 thereby tending to integrate these positive pulses. The voltage at the capacitor 38 is coupled through the resistor 46 to the operational difference amplifier 48 whose feed back circuit including the capacitor 50 and resistor 52 effectively integrates this input to provide a relatively steady output at the conductor 54. The other input conductor 56 of the amplifier 48 is coupled to the common reference conductor 30.

In the circuitry of FIG. 1, compensation for voltage instability of the power input is provided for by the operational amplifier 62, one of whose inputs conductors is connected through the resistor 64 to the movable tap 66 of the potentiometer 40 and the integrating capacitor 68 as shown. When the conductor 10 is positive, voltage compensation current passes through the diode 26, the conductor 30 and through the potentiometer 40 and the resistor 42 to the other conductor 12 and when the conductor 12 is positive, compensation current passes through the diode 28, the resistor 40 and the resistor 44 to the other conductor 10. The second input to the operational amplifier 62 is coupled through resistor 80 to the adjustable tap 78 of potentiometer 76 which is connected to the positive reference source 74 and the common reference conductor 30. Thus, the amplifier 62 sees fluctuation in the powerinput supply voltage and, through its output conductor 70, and the resistor 72, reflects such fluctuations on the operational amplifier 48 previously described, thereby to stabilize the output at 54 to offset fluctuations on the power input lines 10 and 12.

The output of the operational amplifier 48 is coupled through the resistor 82 to the operational amplifier 84 and the other input to this amplifier 84 is coupled through the resistors 86 and 88 and the adjustable tap 90 to the reference voltage source at terminal 58. Dependent upon the position of the adjustable tap 90, the output at the conductor 92 of the operational amplifier 84 will swing abruptly from extreme positive to extreme negative polarity thus deactivating the relay 94 which is connected to the positive voltage terminal 96, only when the input to the conductor 98 of the amplifier 84 reaches some selected value. When this selected value or point is reached, the relay 94 will be deactivated to control either an indicating device such as a warning lamp or to actuate switches to terminate the power supplies at the conductors 10 and 12.

The configuration shown in FIG. 1 is, it will be appreciated, responsive only to leakage currents which are in phase with the voltage impressed across the conductors 10 and 12, but there are many instances where capacitive coupling between the conductors 10 and 12 and to ground are of relatively insignificant interest. It will be appreciated that the system of FIG. 1 may readily be altered to accommodate for three phase power supply by the addition of the requisite third branch to the requisite third power input conductor. It will also be appreciated that the system according to FIG. 1, may be utilized in conjunction with a dc supply provided by the conductors 10 and 12, in which case an internal source of ac voltage is impressed upon the conductors 10 and 12, suitably isolated from the load 14 and from the power source supplying the dc to the conductors 10 and 12, the impressed ac voltage signal being necessary to achieve operation of the detector means 24.

Figure 2:
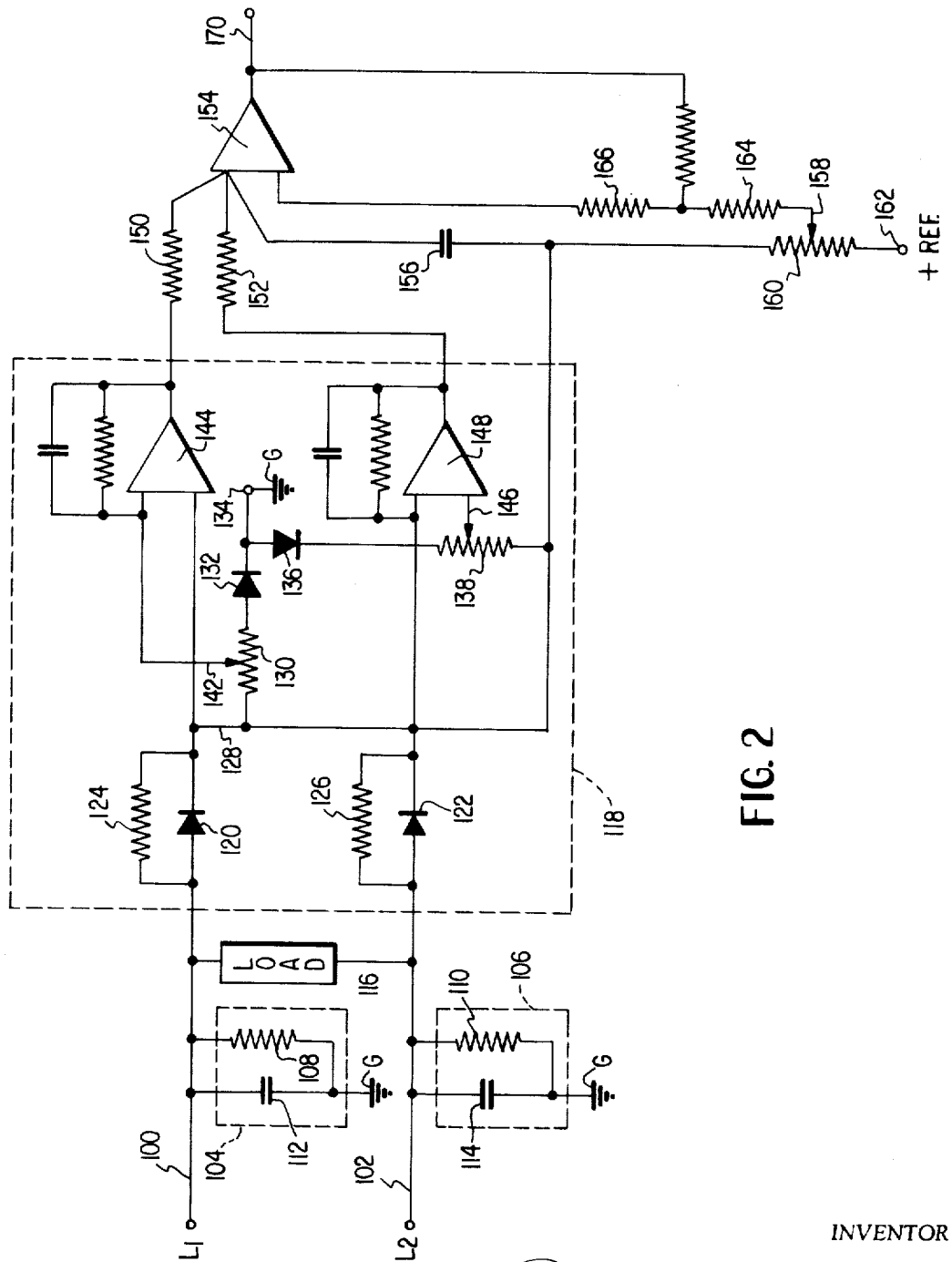
FIG. 2 is a circuit diagram illustrating a modified embodiment of the invention.

FIG. 2 illustrates a modified form of the invention which is adapted to detect leakage currents due to capacitive coupling to ground between the conductors 100 and 102. The leakage current paths for the two conductors 100 and 102 in FIG. 2 are shown within the dashed line boxes 104 and 106 and, for purposes of clarity, each is shown as having a purely resistive leakage path as indicated by the resistors 108 and 110 as well as a purely capacitive leakage path as indicated by the capacitors 112 and 114. It will be appreciated, however, that various and other combinations of capacitive and resistive leakage path connections may exist, but the system as is shown in FIG. 2 will illustrate the principles involved.

In FIG. 2, the load instrument is indicated by the reference character 116 and the detecting circuit is enclosed within the dashed line box 118. As is the case with the FIG. 1 circuitry, a pair of diodes 120 and 122 are provided in the detector circuit and these two diodes are bridged by the respective resistors 124 and 126. During a positive half cycle on the input conductor 100, the leakage current branch is through the diode 120, the conductor 128, the potentiometer 130 and the diode 132 to the grounded terminal 134 and thence through ground and through the resistor 110 to the other conductor 102. At the same time, this leakage current path charges the capacitor 114 and, at the same time, the capacitor 114 is charged through the leakage path from the conductor 100, through the resistor 108, through the capacitor 114 through the voltage impressed across the resistor 110. When the conductor 102 swings positive, the charge on the capacitor 114 is discharged and part of this discharge current flows through ground to the terminal 134 and through the diode 136 through the potentiometer 138 and the conductor 140, the conductor 128 and the resistor 124 to the conductor 100. At the same time, of course, the other main branch of the leakage path is established through the diode 122, the conductor 128 and the potentiometer 130, through the diode 132 and to ground through the terminal 136 and thence through the resistor 108 to the other conductor 100. Thus, during each of the positive half cycles on the conductors 100 and 102, the two main branches through the respective diodes 120 and 122 produce positive pulses at the adjustable tap 142 which is applied as an input to the operational amplifier 144 whereas, at the same time, the out of phase leakage current due to the capacitive couplings 112 and 114 are applied through the auxiliary diode 136 and the potentiometer 138 such that the adjustable tap 146 couples this out of phase leakage current signal to the operational amplifier 148. The operational amplifier 144 is connected in inverting mode whereas the operational amplifier 148 is connected in non-inverting mode and their respective outputs are coupled through the resistors 150 and 152 to one input of the operational amplifier 154 which corresponds to the amplifier 84 in FIG. 1. The summing resistors 150 and 152, taken in conjunction with the integrating capacitor 156 provide an input to the amplifier 154 which may be slowly varied and is a sum of the in phase and out of phase leakage currents associated with the ground couplings 104 and 106 of the conductors 100 and 102. The other input to the amplifier 154 is through the adjustable tap 158 of the potentiometer 160 connected to the positive reference voltage terminal 162 and through the resistors 164 and 166, substantially as is shown. Thus, dependent upon the set point established by the positioning of the movable tap 158, the amplifier 154 swings its output at the conductor 170 abruptly from extreme positive to extreme negative polarity only upon attainment of a selected summation leakage current which may have any out of phase relationship between the limits of pure resistance to pure capacitance so as to actuate a relay or other device as is described in conjunction with FIG. 1.

In FIG. 2, it will be seen that the in phase leakage current through the resistor 110 and the wattless or out of phase leakage current across the capacitor 114 are summed by the respective amplifiers 144 and 148, whereas the in phase leakage current through the resistor 108 and out of phase leakage current establishing the charge on the capacitor 112 are respectively summed by the amplifiers 144 and 148, respectively when the conductors 100 and 102 swing positive.

Figure 3:
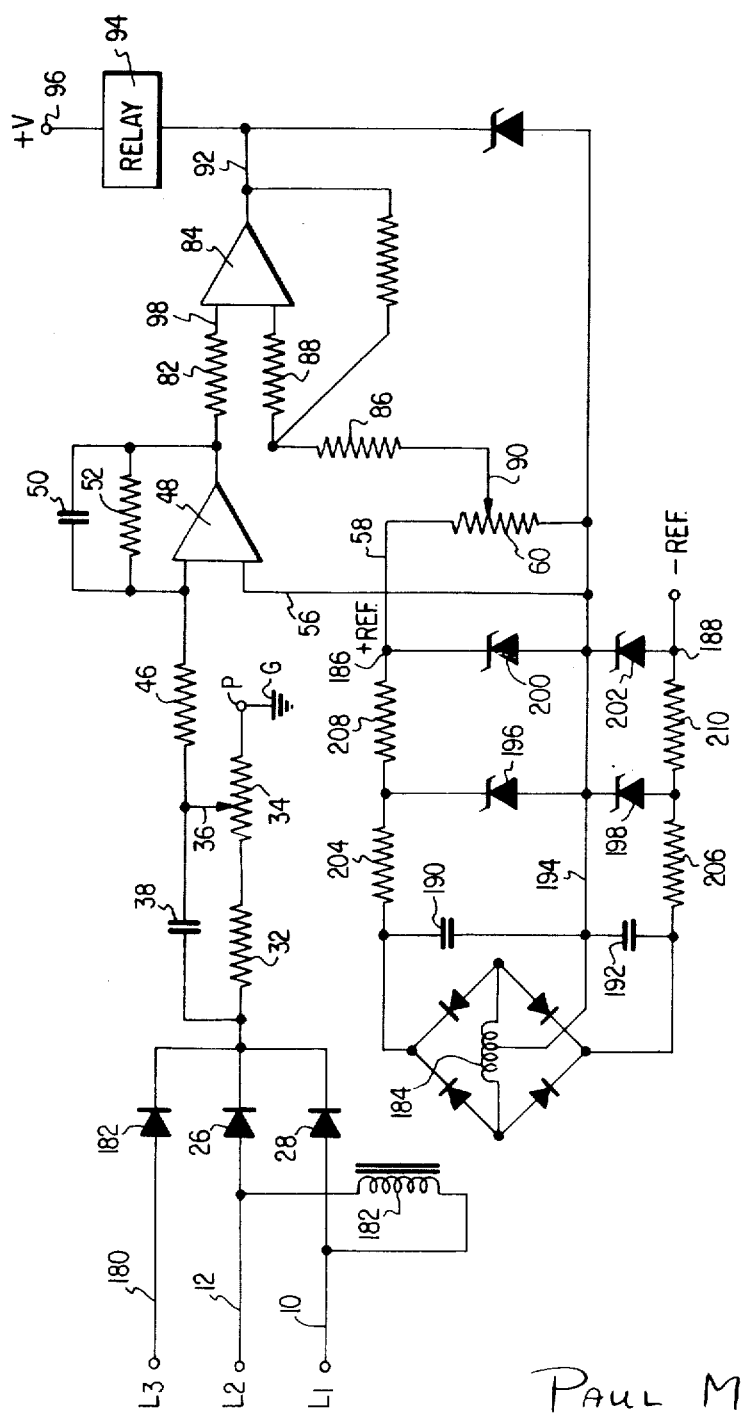
FIG. 3 is a circuit diagram illustrating further aspects of the present invention.

The system shown in FIG. 3 is similar in many respects to the system described above in conjunction with FIG. 1. However, for simplicity the voltage compensation circuitry has been omitted in FIG. 3, and, FIG. 3 shows a three phase power system which includes, in addition to the two conductors 10 and 12, the third power input conductor 180. This latter power input conductor provides a third main branch for leakage current through the diode 182.

FIG. 3 also illustrates the power source which may be incorporated in the monitoring circuitry. In the instance shown, the primary winding 182 of the power transformer is connected across the conductors 10 and 12 and the secondary 184 of this power transformer is connected through the diode bridge between the positive and negative reference voltage points 186 and 188 by means of the capacitors 190 and 192 connected to the center tap conductor 194 of the transformer secondary 184. Zener diodes 196, 198, 200 and 202 and the resistors 204, 206, 208 and 210 complete the reference voltage source. In all other respects, the circuitry of FIG. 3 is identical with that shown in FIG. 1 except, as noted before, the voltage stabilization circuitry has been omitted in FIG. 3 and, as well, the load and the ground fault connections from the various conductors 10, 12 and 180 have also been omitted.

The present invention, therefore, is well adapted to carry out the objects and attain the ends and advantages mentioned as well as others inherent therein. While the presently preferred embodiments of the invention are given for the purpose of disclosure, numerous changes in the details of construction and arrangement of parts may be made which will readily suggest themselves to those skilled in the art and which are encompassed within the spirit of the invention and the scope of the appended claims.

The invention may be of module form and to include connections for single as well as three phase operations, including the voltage stabilization and circuitry and the self contained dc power supply. Additionally, an alternating current source battery driven for impressing the necessary ac voltage on a system which is otherwise dc may be included.

What is claimed is:

1. A monitoring circuit for detecting leakage currents from power input conductors connected to a load, which input conductors carry an ac voltage, comprising:

detector means connected across said input conductors and connected to ground for passing leakage current whenever either of said input conductors has a leakage connection to ground, said detector means including first branch means for passing a first leakage current between said input conductors during alternate half cycle of said ac voltage when one input conductor has a leakage connection to ground and second branch means for passing a second leakage current between said input conductors during the remaining half cycles when the other input conductor has a leakage connection to ground;

amplifier means having signals representing said leakage currents as inputs thereto; and means connected to said amplifier means for effecting an operative output therefrom only in response to a selected level of input to said amplifier means.

2. A monitoring circuit for detecting leakage currents from power input conductors connected to a load, which input conductors carry an ac voltage, comprising:

detector means connected across said input conductors and connected to ground for passing leakage currents therethrough on alternate half cycles of said ac voltage;

amplifier means having signals representing said leakage currents as inputs thereto; and means connected to said amplifier means for effecting an operative output therefrom only in response to a selected level of input to said amplifier means;

said first branch means including a diode connected to said other input conductor and poled to pass said first leakage current only during a positive half cycle on said other input conductor, said second branch means includes a diode connected to said one input conductor and poled to pass said second leakage current only during a positive half cycle on said one input conductor, said diodes being connected in common to ground, said detector means also including an amplifier having a common input for the leakage currents passing each diode.

3. A monitoring circuit for detecting leakage currents from power input conductors connected to a load, which input conductors carry an ac voltage, comprising:

detector means connected across said input conductors and connected to ground for passing leakage currents therethrough on alternate half cycles of said ac voltage;

amplifier means having signals representing said leakage currents as inputs thereto;

means connected to said amplifier means for effecting an operative output therefrom only in response to a selected level of input to said amplifier means;

said first branch means including a diode connected to said other input conductor and poled to pass said first leakage current only during a positive half cycle on said other input conductor, said second branch means includes a diode connected to said one input conductor and poled to pass said second leakage current only during a positive half cycle on said one input conductor, said diodes being connected in common to ground, said detector means also including an amplifier having a common input for the leakage currents passing each diode;

a further diode connected between ground and in common to said input conductors to pass out of phase leakage current due to capacitive coupling of said input conductors to ground;

a second amplifier having signals representing said out of phase leakage currents as input thereto; and means for summing the outputs of the first mentioned and said second amplifiers.

4. The monitoring circuit according to claim 3 wherein one of said first and said second amplifier is operated in inverting mode and the other is operated in non-inverting mode.

5. The monitoring circuit according to claim 4 wherein said means connected to said amplifier means comprises a further amplifier having an adjustable reference voltage as an input thereto, and a relay actuated by said further amplifier.

6. A monitoring circuit for detecting leakage currents from power input conductors connected to a load, which input conductors carry an ac voltage, comprising:

detector means connected across said input conductors and connected to ground for passing leakage currents therethrough on alternate half cycles of said ac voltage;

amplifier means having signals representing said leakage currents as inputs thereto; and means connected to said amplifier means for effecting an operative output therefrom only in response to a selected level of input to said amplifier means;

said amplifier means comprising a first amplifier having an output proportional to leakage currents in phase with said ac voltage, and a second amplifier having an output proportional to leakage currents out of phase with said ac voltage.

7. The monitoring circuit according to claim 6 wherein one of said amplifiers is operated in inverting mode and the other amplifier is operated in non-inverting mode.

8. The monitoring circuit according to claim 7 wherein said means connected to said amplifier means comprises a further amplifier having an adjustable reference voltage as an input thereto, and a relay actuated by said further amplifier.

9. The monitoring circuit according to claim 1 including a voltage stabilizing amplifier connected to said amplifier means.

10. The monitoring circuit according to claim 1 including a reference voltage transformer connected across a pair of said input conductors, rectifying means connected to said transformer, and said rectifying means supplying reference voltage to said means connected to said amplifier means.

11. A monitoring circuit for detecting leakage currents from power input conductors connected to a load, which input conductors carry an ac voltage, comprising:

detector means connected across said input conductors and connected to ground for passing leakage currents therethrough on alternate half cycles of said ac voltage;

amplifier means having signals representing said leakage currents as inputs thereto;

means connected to said amplifier means for effecting an operative output therefrom only in response to a selected level of input to said amplifier means; and reference voltage transformer connected across a pair of said input conductors, rectifying means connected to said transformer, and said rectifying means supplying reference voltage to said means connected to said amplifier means;

said amplifier means comprising a first amplifier having an output proportional to leakage currents in phase with said ac voltage, and a second amplifier having an output proportional to leakage currents out of phase with said ac voltage.

12. The monitoring circuit according to claim 11 wherein one of said amplifiers is operated in inverting mode and the other amplifier is operated in non-inverting mode.

13. The monitoring circuit according to claim 12 wherein said means connected to said amplifier means comprises a further amplifier having an adjustable reference voltage as an input thereto, and a relay actuated by said further amplifier.

14. The monitoring circuit according to claim 13 including a voltage stabilizing amplifier connected to said amplifier means.

* * * * *